May 8, 1934.  C. P. DUBBS  1,958,267
PROCESS FOR TREATING HYDROCARBON OILS
Original Filed Dec. 21, 1917   2 Sheets-Sheet 1
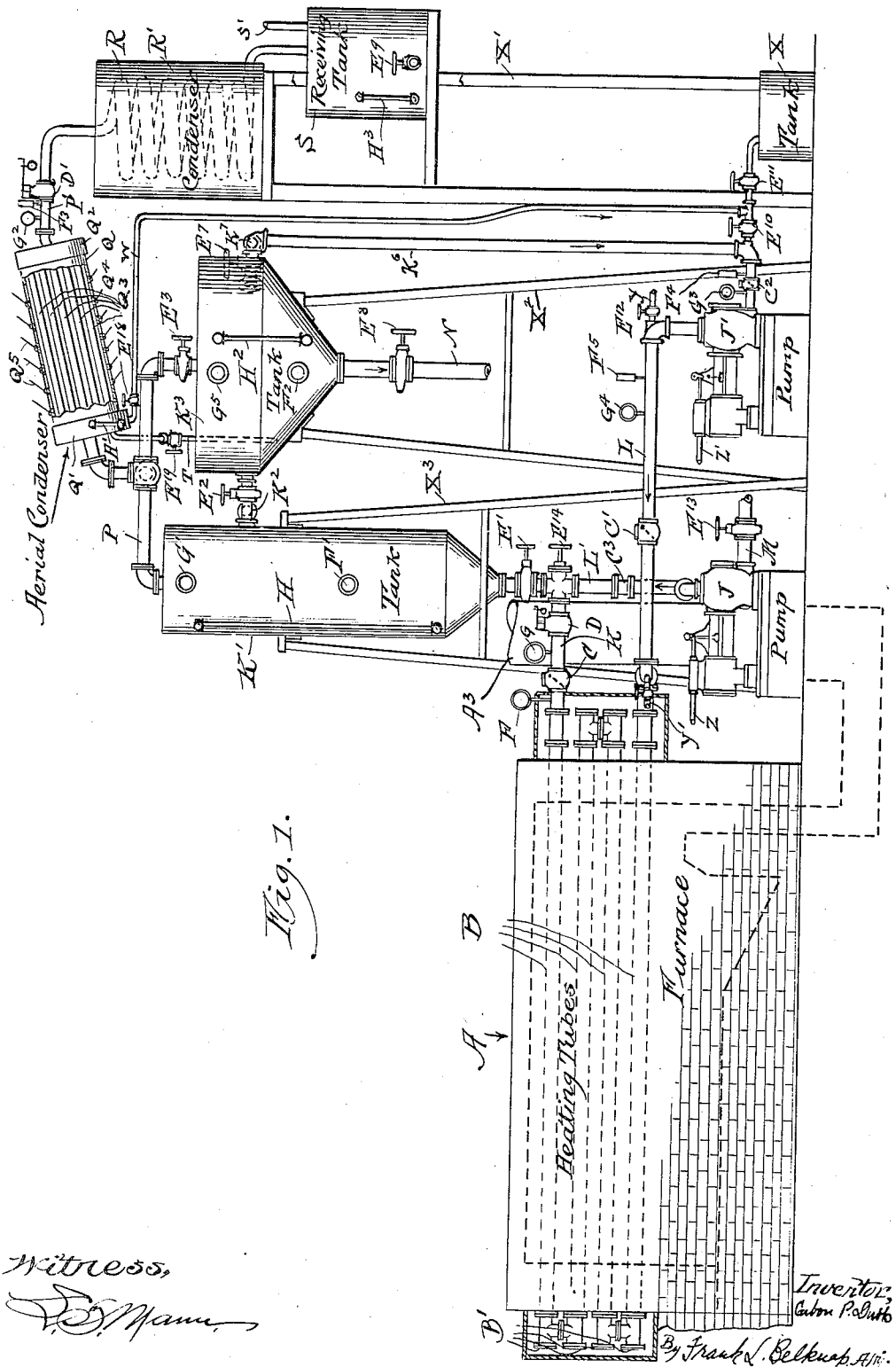

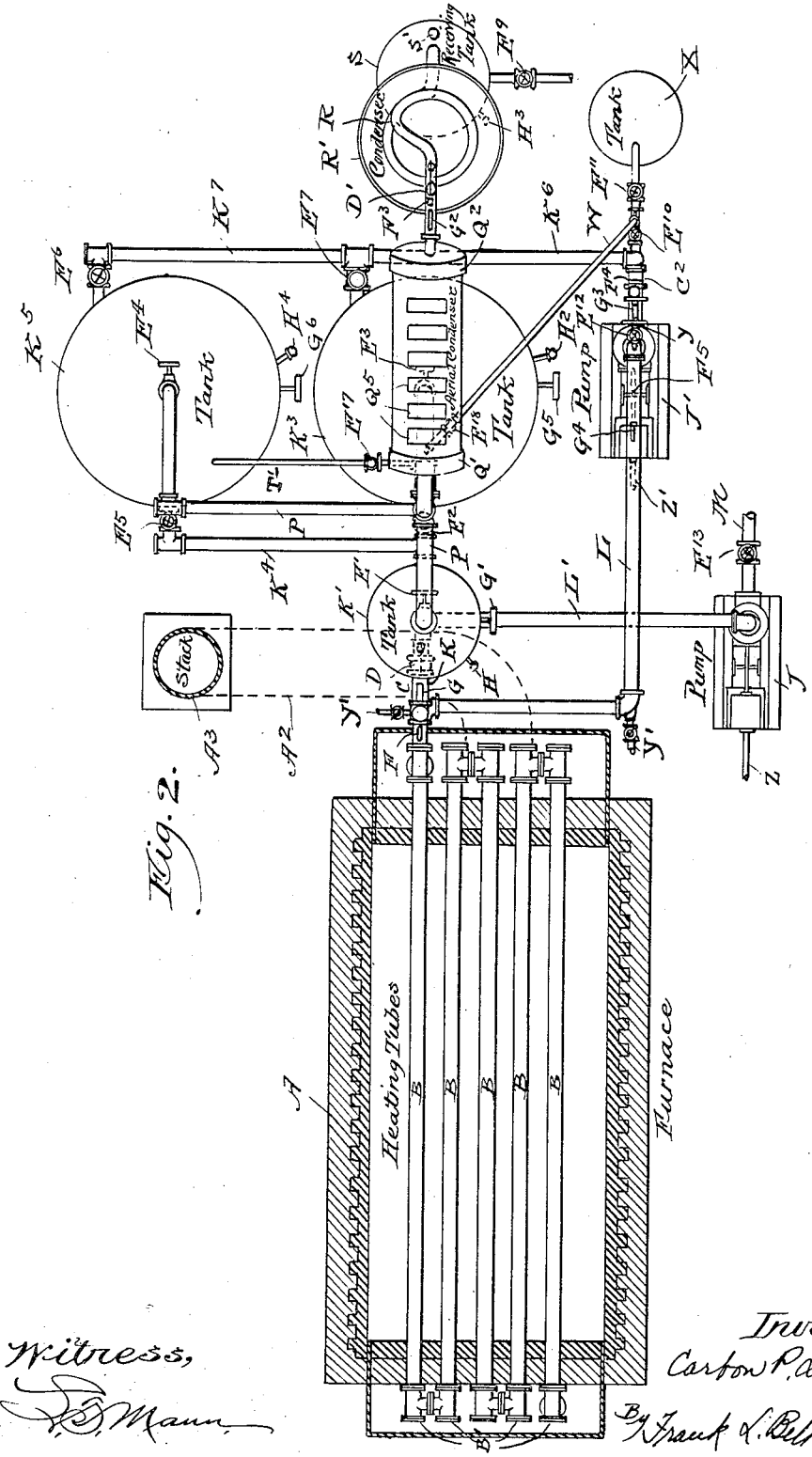

Patented May 8, 1934

1,958,267

UNITED STATES PATENT OFFICE 1,958,267

PROCESS FOR TREATING HYDROCARBON OILS

Carbon P. Dubbs, Wilmette, Ill., assignor to Universal Oil Products Company, Chicago, Ill., a corporation of South Dakota Original application December 21, 1917, Serial No. 208,206. Divided and this application June 15, 1920, Serial No. 389,212

3 Claims. (Cl. 196—59)

This invention relates to process for treating hydrocarbon oils to produce therefrom products having lower boiling points.

This application is a divisional of an original application filed by me in the United States Patent Office, on December 21, 1917, Serial No. 208,206.

My invention contemplates, among other things, a process and apparatus whereby crude petroleum, petroleum distillates, petroleum residuum, or mixtures thereof are passed through same and more or less converted to lower boiling point products; other objects of my invention are to provide a method and means for heating oils in coils while maintaining the oil under definitely controlled velocity and temperatures, then passing the heated oil to an upright tank and from there into a settling tank and then back through the same heating coils; to provide a method and means for continuously treating petroleum for production of lower boiling point products; to provide a method and means for automatically condensing the heavy vapors and returning same for further treatment; to provide a method and means whereby either water, in the shape of water or steam or both can be injected into the oil while undergoing treatment; to provide a method and means whereby any water condensed in the reflux condenser is automatically trapped and either automatically returned to the heating coils or withdrawn from the system; to provide a method and means for holding a higher pressure upon the oil while same is circulated through the heating tubes and holding a lower pressure on the upright and settling tanks and reflux condenser; to provide a method and means for rapid circulation of oil in the heating coils and relatively slow circulation in the settling tank; to provide a method and means for passing the heated oil up through a body of oil; to provide a method and means of continuously feeding raw material and continuously taking off lower boiling point products and also for continuously taking off the residuum containing more or less free carbon; to provide a method and means to prevent the free carbon or other solids from settling on the walls of the heating tubes; to provide a method and means whereby the forced circulation in a continuous coil creates a pressure on the oil in excess of that maintained on the rest of the apparatus whereby the oil in said coil can be subjected to a higher heat without being converted, to any great amount, into vapors, and said oil is passed into a chamber of lower pressure, the boiling point of said heated oil is thereby lowered and more or less of same thus converted into vapors; to provide a method and means whereby the oil while being heated is maintained at a relatively high velocity and then passes in a much larger stream through a settling tank and owing to this stream being much larger its velocity has been greatly reduced which will cause the excess carbon held in the oil to be precipitated out; to provide a method and means whereby the length of time the oil being treated is subjected to heat during any one time is under full control; to provide a method and means whereby the amount of heavy vapors condensed and returned for further treatment is controlled; to provide a method and means whereby any partial obstruction in the heating tubes automatically thereby increases the velocity of the oil at said point of partial obstruction which will act to remove such obstruction; to provide a method and means for maintaining the interior surface of the tubes in a smooth highly polished condition by means of passing the oil through same at a high velocity; to provide a method and means for frequently relieving the oil in the heating tubes of its vapor contents; to provide a means for bringing part of the residuum to a quiescent state and allowing the free carbon or other solids to settle and withdrawing same and returning the settled residuum back into the circulation for further treatment; and in general to provide an improved process and apparatus of the character referred to.

In the drawings:

Fig. 1 is a side elevation of the apparatus, partly in section and partly broken away.

Fig. 2 is a plan view of the apparatus, with parts in section.

Referring to the drawings; A is the furnace in which the heating tubes B are positioned. A—2 is a flue tunnel connecting said furnace to stack marked A—3. B—1 are return connections on the ends of the tubes B and on these return connections, positioned on the end of each tube are flanges which may be readily removed and the interior of each of the tubes be examined and cleaned.

C, C—1, C—2, C—3, are check valves positioned on the different lines.

D and D—1 are pressure regulating valves.

E—1 to E—14 inclusive and E—17, E—18 and E—19 are throttle valves.

F, F—1, F—2, F—3, F—4 and F—5 are pyrometers.

G, G—1 to G—6 inclusive are pressure gauges.

H, H—1, H—2, H—3, H—4 are glass liquid level gauges.

J, J—1 are steam pumps; K is the discharge line from the heating coil B to the tank K—1. K—2 is the overflow from tank K—1 to tank K—3, and connected with K—2 is line K—4 to tank K—5 having positioned on it valve E—5. K—6 is suction line connecting pump J—1 to tank K—3 and connecting with suction line K—6 is suction line K—7 connecting it with tank K—5 and on these two suction lines are positioned valves E—6 and E—7.

L is discharge line from pump J—1 to the heating tubes B and L—1 is the discharge line from pump J to tank K—1.

M is the suction line to pump J. N is the draw-off from the bottom of tank K—3, a similar one being positioned on the bottom of tank K—5.

P are the vapor lines from tanks K—1, K—3 and K—5 leading to a reflux air condenser Q.

Q—1 is a header on the lower end of the air condenser and Q—2 is a header on the upper end of this condenser which are connected by the slanting tubes Q—3, and out of the header Q—2 extends vapor line P—1 connecting with condensing coils R positioned in the water cooling tank R—1 and extending to the top of tank S, and extending out of the top of tank S is gas line S—1. Q—4 and Q—5 are doors in the housing surrounding the tubes Q—3 of the reflux air condenser Q, these doors being for the purpose of controlling the amount of air circulated around the tubes Q—3.

T is a line extending from the end of the header Q—1 into the tank K—3 with branch T—1 extending to tank K—5.

W is a line extending from the bottom of the header Q—1 into the bottom of the suction line K—6 or can be drained into the tank X. X—1, X—2 and X—3 are supports for the different parts of the apparatus.

Y is a line entering the discharge pipe L through which steam or water or both are injected from any suitable source of supply. Y—1 being another line for a similar purpose. Z and Z—1 are steam lines to pumps J and J—1.

Now describing the operation of the process, the material to be treated is drawn from any suitable source of supply through line M, through pump J, through line L—1 into the different parts of the apparatus until the proper amount of the material to be treated has been charged into the said apparatus, which amount should be sufficient to fill the heating tubes B, and tank K—1 to overflow into tank K—3 and tank K—5 to overflow suction line K—6 so that suction line K—6 will always be covered while pump J—1 is in operation. Pump J is then shut down for the time being and pump J—1 is put into operation and by this means the oil is circulated through discharge line L into and through the heating tubes B then through line K into and through tank K—1 to overflow K—2 into and through tank K—3 and then to overflow suction K—6, into and through pump J—1 and so on as above described. Fire is placed in the furance A and maintained at a proper temperature, which temperature will range from 400° to 2400° F. The specific temperature that will be used in any one case will depend on many things, such as the volume of oil treated in any given period of time also on the velocity at which the oil is passed through the heating tubes B also on the character of material being treated.

As the oil passes through the heating tubes B it is subjected to the proper heating and then is passed up through the oil contained in the tank K—1 and the vapors liberated in this tank pass out through the vapor lines P while the oil overflows from tank K—1 through overflow pipe K—2 into tank K—3 and the vapors liberated while the oil is passing through tank K—3 pass up through the vapor line P into the header Q—1 through air cooled tubes Q—3 and into header Q—2 and from there through pressure valve D—1 through condensing coils R into receiving tank S from which the distillate is drawn either continuously or intermittently through valve E—9, while the uncondensible gas is drawn off through line S—1. K—5 is a tank similar in detail to tank K—3, and is so connected with the apparatus by means of overflow pipe K—4 and overflow suction pipe K—7 and vapor line P, that either or both of these tanks can be used or either be cut out and cleaned while the other is in use and the apparatus maintained in operation. For instance, tank K—3 can be cut out of the apparatus by the closing of the valves E—2, E—7, E—3 and E—19 which will cut out the tank K—3 and by opening valves E—5, E—4, E—6 and E—17 will put in commission the tank K—5 and the tank K—3 can then be cleaned; and reversing the opening and shutting of the above mentioned valves will put tank K—3 back in operation and cut out tank K—5.

The vapors condensed in the header Q—2 and the connecting pipes Q—3 and header Q—1 will flow into the header Q—1 and then be drained back through lines T or T' into tank K—3 or tank K—5 according to which is in operation, and any water condensed along with this distillate will be collected in header Q—1 and can be drawn off through line W into tank X by the closing of valve E—10 and the opening of valve E—11 or it may be returned to the apparatus into the bottom of suction line K—6 by opening valve E—10 and closing E—11, or the distillate collected in Q—1 may be handled in the same way. As the oil passes through tank K—3 or tank K—5 and while the volume passing through these tanks in any given space of time, is as great as the oil passed through the heating tubes B in the same given time, yet the mass movement in the tank K—3 or tank K—5 will be so much slower that the oil will not be able to carry in suspension the amount of free carbon or other solids that it was able to carry in suspension while passing through the heating tubes B, and therefore this excess carbon or other solids will settle out in said tank K—3 or tank K—5 and be drawn off with the residuum through line N and which residuum can be drawn off either intermittently or continuously, or no residuum at all is drawn off and the free carbon and other solids allowed to collect in the bottom of the tanks K—3 or K—5, and when an accumulation has been attained in either of these tanks, that particular tank can be cut out from the apparatus, as already described, and the said tank be cleaned and then be put into operation and in the meantime the free carbon and other solids will accumulate in the other tank in the same manner. A fresh supply of raw material may be fed either continuously or intermittently into the apparatus through line M through pump J, through discharge line L—1 into the bottom of tank K—1. Steam or water or both may be fed into the apparatus through line Y into discharge line L either continuously or intermittently.

The higher the velocity at which the oil is circulated through the heating tubes B, the higher will be the additional pressure on such oil while in said tubes over and above such pressure maintained on the rest of the apparatus, and in order to increase the pressure above that additional pressure that will be created on the oil by the velocity that it is desired to maintain the oil at in the heating tubes, I have placed a pressure regulating device on the discharge line of these tubes and marked it D.

It will be seen that my process and apparatus herein described, permits of the continuous treatment of petroleum wherein such petroleum is repeatedly subjected to a heating zone under a higher pressure than is maintained elsewhere on the apparatus, such heated oil repeatedly percolated up through a body of oil, repeatedly passes through a settling tank, and while passing through the latter two places, the oil freed of its vapor contents which pass up in a reflux condenser wherein the heavy vapors are condensed and automatically returned to the apparatus while the remaining vapors pass on through the water cooled condenser and are collected separately, while the remaining unvaporized oil and condensate from the reflux condenser are again subjected to further heat treatment. It will also be seen that by my herein described method the distillates from the reflux condenser can be returned to the oil in the settling tank or returned practically direct to the suction side of the circulation pump. It will further be seen that by my method herein described, I can use either water or steam or both in the heating tubes and such water condensed in the reflux condenser, trapped and withdrawn from the apparatus or automatically returned back to the heating tubes. It will also be seen by my herein described apparatus that I can distill practically all the oil put into the apparatus without withdrawing from the apparatus any substantial amount of liquid residue, but continue to feed fresh raw material into the apparatus and yet not plug my heating tubes with carbon. It will also be seen that by my apparatus herein described, the grade of final distillate allowed to pass from the process is definitely controlled by means of the reflux condenser.

The pressure that can be used on the apparatus will vary from zero to 1000 lbs. per square inch, but in all cases the pressure on the oil while passing through the heating tubes will be more than the pressure maintained on the rest of the apparatus, and where such rest of the apparatus is over the pressure of one atmosphere, then such pressure is reduced to, atmospheric pressure at D—1. It will be understood that the pressure maintained on the apparatus will be governed by the boiling point of the products produced, and the quantity produced, and the temperature to which the oil is subjected in the heating tubes and whether heated in connection with water or steam or both, and these will vary according to the raw material used, all of which are of very considerable commercial value. In the apparatus here shown it will be noted that the condensation of the final product in the water condenser and receiving tank takes place at atmospheric pressure.

It will be understood that while I herewith furnish drawings and describe a certain apparatus, yet I do not limit myself to any particular construction of apparatus or arrangement of same.

I claim as my invention:

1. A process for cracking hydrocarbon oil, comprising passing a stream of oil through a coil of a heating zone to be heated to a cracking temperature, in collecting said heated oil in serially communicating vertical oil pools, in discharging vapors generated from said oil pools and subjecting them to reflux condensation, in returning reflux condensate under a forced mechanical pressure to the coil in the heating zone, in discharging carbon containing residual oil from one of said oil pools without again admitting the same to the heating zone, in introducing pressure charging stock to the system, in discharging uncondensed vapors after reflux condensation for final condensation, and in maintaining a superatmospheric pressure of generated vapors on said oil in the heating zone on said oil bodies and on the vapors undergoing reflux condensation.

2. A process for cracking hydrocarbon oil, comprising passing a stream of oil through a heating zone to be heated to a cracking temperature, in collecting the heated oil in a plurality of separate enlarged zones in each of which zones bodies of oil accumulate, in passing oil from one of the enlarged zones in a restricted body to a succeeding enlarged zone, in removing vapors generated from the oil in each of said enlarged zones and subjecting said vapors to reflux condensation, in returning reflux condensate to the oil stream passing through the heating zone, in withdrawing heavy carbon containing residuum from one of said enlarged zones, and in maintaining a superatmospheric pressure on the oil undergoing conversion.

3. A process of oil conversion, consisting in passing a stream of oil through a heating zone to be heated to a cracking temperature, in passing the heated oil to an enlarged zone where a pool of oil accumulates, in flowing oil from the enlarged zone in a restricted stream to a second enlarged zone where a pool of oil accumulates, in subjecting vapors generated from said oil to reflux condensation, in returning reflux condensate to the heating zone to pass therethrough for retreatment, in withdrawing heavy carbon containing residuum from the last pool in the series and in maintaining a superatmospheric pressure on the oil undergoing conversion.

CARBON P. DUBBS.